United States Patent
Sekimoto

(10) Patent No.: US 9,071,159 B2
(45) Date of Patent: Jun. 30, 2015

(54) POWER CONVERTER

(75) Inventor: Morimitsu Sekimoto, Shiga (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 559 days.

(21) Appl. No.: 13/388,027

(22) PCT Filed: Jul. 28, 2010

(86) PCT No.: PCT/JP2010/004798
§ 371 (c)(1),
(2), (4) Date: Jan. 30, 2012

(87) PCT Pub. No.: WO2011/013369
PCT Pub. Date: Feb. 3, 2011

(65) Prior Publication Data
US 2012/0127768 A1    May 24, 2012

(30) Foreign Application Priority Data
Jul. 31, 2009    (JP) .................... 2009-179501

(51) Int. Cl.
*H02M 3/335* (2006.01)
*H02M 1/38* (2007.01)
*H02M 7/219* (2006.01)

(52) U.S. Cl.
CPC .......... *H02M 1/38* (2013.01); *H02M 2001/385* (2013.01); *H02M 2007/2195* (2013.01); *Y02B 70/1408* (2013.01)

(58) Field of Classification Search
CPC ............ H02M 3/33523; H02M 7/219; H02M 2001/0045; H02M 3/158; H02M 3/1582; H02M 3/335; H02J 7/008; H02J 7/0091; H02J 7/345; Y02B 70/1433

USPC ................. 323/222, 224, 226–268, 272, 276, 323/282–288; 363/21.05, 21.07, 21.09, 37, 363/39, 41, 89, 97, 98, 17
See application file for complete search history.

(56) References Cited

U.S. PATENT DOCUMENTS

| 4,656,572 A | 4/1987 | Caputo et al. |
| 5,491,624 A * | 2/1996 | Levran et al. .................. 363/87 |

(Continued)

FOREIGN PATENT DOCUMENTS

| CN | 101378232 A | 3/2009 |
| CN | 101401289 A | 4/2009 |

(Continued)

OTHER PUBLICATIONS

Choi et al., "Inverter Output Voltage Synthesis Using Novel Dead Time Compensation", Trans. KIEE, vol. 44, No. 4, Apr. 1995, pp. 453-459 (12 pages provided with partial English translation).

(Continued)

*Primary Examiner* — Rajnikant Patel
(74) *Attorney, Agent, or Firm* — Birch, Stewart, Kolasch & Birch, LLP

(57) ABSTRACT

A power converter includes a power converter section (4) (e.g., an inverter circuit) having a plurality of switching elements ($S_p$, $S_n$) in which a current can flow in a reverse direction, and a control section (10) which determines on-state time of each of the switching elements ($S_p$, $S_n$) according to an output voltage of the power converter section (4), thereby switching on/off states of the switching elements ($S_p$, $S_n$). The control section (10) instructs the power converter section (4) to perform synchronous rectification, and corrects the on-state time according to a drop of an on-state voltage of each of the switching elements ($S_p$, $S_n$).

4 Claims, 4 Drawing Sheets

(56) References Cited

U.S. PATENT DOCUMENTS

| | | | |
|---|---|---|---|
| 5,982,645 A * | 11/1999 | Levran et al. | 363/37 |
| 6,426,884 B1 | 7/2002 | Sun | |
| 7,262,582 B2 * | 8/2007 | Warita et al. | 323/222 |
| 7,301,312 B2 * | 11/2007 | Nishino | 323/222 |
| 7,746,042 B2 * | 6/2010 | Williams et al. | 323/223 |
| 2003/0169611 A1 | 9/2003 | Nishizawa et al. | |
| 2007/0008757 A1 | 1/2007 | Usui et al. | |
| 2009/0059622 A1 | 3/2009 | Shimada et al. | |
| 2009/0135636 A1 | 5/2009 | Kuzumaki et al. | |
| 2011/0019440 A1 | 1/2011 | Shimada et al. | |
| 2011/0128759 A1 | 6/2011 | Shimada et al. | |
| 2011/0192838 A1 * | 8/2011 | Fujita et al. | 219/661 |

FOREIGN PATENT DOCUMENTS

| | | | |
|---|---|---|---|
| EP | 2058861 A1 * | 5/2009 | |
| JP | 2001-061276 A | 3/2001 | |
| JP | 2001-309662 A | 11/2001 | |
| JP | 2004-64948 A | 2/2004 | |
| JP | 2004-135457 A | 4/2004 | |
| JP | 2006-74898 A | 3/2006 | |
| JP | 2008-61404 A | 3/2008 | |
| JP | 2009-27815 A | 2/2009 | |
| JP | 4264837 B2 | 5/2009 | |
| JP | 2010-154726 A | 7/2010 | |
| WO | WO 02/084855 A1 | 10/2002 | |
| WO | WO 2006/118026 A1 | 11/2006 | |

OTHER PUBLICATIONS

Cooper et al., "Status and Prospects for SiC Power MOSFETs", IEEE Transactions on Electron Devices, vol. 49, No. 4, Apr. 2002, 7 pages provided.

English machine translation of JP-2004-64948-A dated Feb. 26, 2004.

Holtz et al., "Sensorless Vector Control of Induction Motors at Very Low Speed Using a Nonlinear Inverter Model and Parameter Identification," IEEE Transactions on Industry Applications, vol. 38, No. 4, Jul./Aug. 2002, pp. 1087-1095.

Qiao et al., "Unified Constant Frequency Integration Control of Three-Phase Standard Bridge Boost Rectifiers With Power-Factor Correction," IEEE Transactions on Industrial Electronics, vol. 50, No. 1, Feb. 2003, pp. 100-107.

* cited by examiner

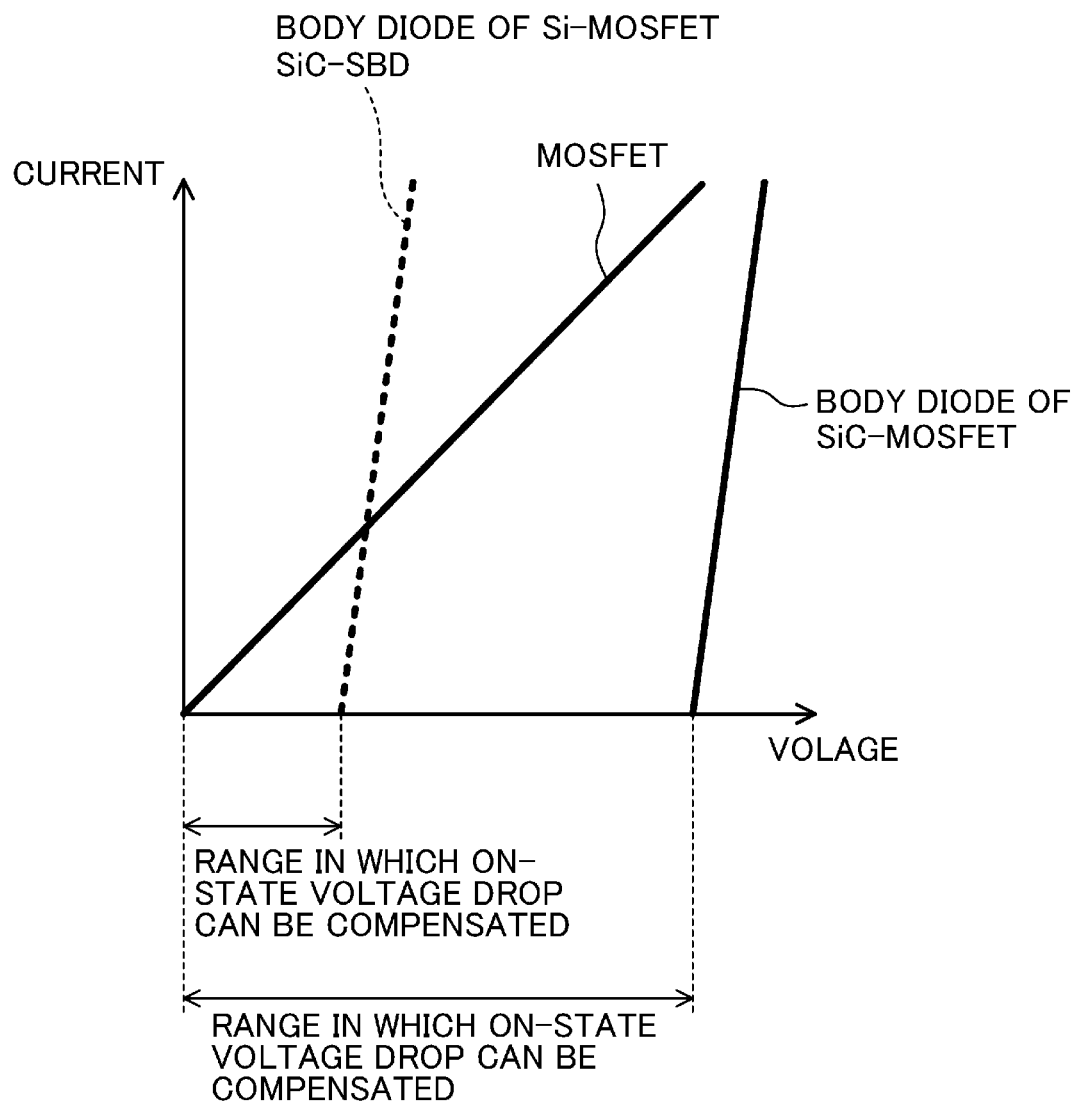

POWER CONVERTER

TECHNICAL FIELD

The present invention relates to power converters which have a power converter section including a plurality of switching elements.

BACKGROUND ART

Power converters which have an inverter circuit including a plurality of switching elements, and a switching control section for controlling the actuation of the switching elements have been known. Such power converters are widely used, for example, in household electric appliances and industrial equipment in which the number of revolutions and the torque of the motor need to be controlled.

In the power converters, in general, a freewheeling diode is connected in antiparallel to each of the switching elements. Due to on-state voltage drop at a time when a current flows in the switching elements and the freewheeling diodes, the actual output voltage differs from the voltage instructed. Accordingly, the output current and the torque may be distorted.

To solve this problem, a method of determining a voltage instruction of the inverter in consideration of an on-state voltage drop of the device is shown, for example, in Patent Document 1. In Patent Document 1, the on-state voltage drop is compensated by considering the effect of dead time, too, which is set so that a pair of switching elements connected together in series in the inverter circuit will not be turned on simultaneously.

CITATION LIST

Patent Document 1: Japanese Patent Publication No. 2004-64948

SUMMARY OF THE INVENTION

Technical Problem

According to general inverter circuits, a freewheeling diode is connected in antiparallel to each switching element as described above. Therefore, the timing and the amount of current flowing in the devices may vary according to the duty cycle, the current polarity, and the characteristics of the devices. Accordingly, to accurately compensate for the on-state voltage drop, it is necessary to detect the on-state voltage drop of each of the devices in consideration of the above conditions. Thus, the control is very complex.

The present invention was made in view of the above problems, and it is an objective of the invention to provide a power converter which has a power converter section including a plurality of switching elements, in which an output voltage, etc. is compensated for an on-state voltage drop of a device easily and accurately.

Solution to the Problem

To solve the above problem, the first aspect of the present invention includes a power converter section (4) having a plurality of switching elements ($S_p$, $S_n$) in which a current can flow in a reverse direction, and a control section (10) which determines on-state time of each of the switching elements ($S_p$, $S_n$) according to an output voltage of the power converter section (4), thereby switching on/off states of the switching elements ($S_p$, $S_n$), wherein the control section (10) instructs the power converter section (4) to perform synchronous rectification, and corrects the on-state time according to a drop of an on-state voltage of each of the switching elements ($S_p$, $S_n$).

In this structure, a reverse direction current can flow in the switching elements ($S_p$, $S_n$). Therefore, the on-state voltage drop caused in the switching elements ($S_p$, $S_n$) is the only drop of the on-state voltage of the device caused in the inverter circuit (4). Accordingly, it is possible to easily obtain the drop of the on-state voltage in the inverter circuit (4), and the output voltage etc. can be easily compensated for the drop of the on-state voltage. Since the on-state time is corrected in consideration of the on-state voltage drop of the switching elements ($S_p$, $S_n$), errors of the output voltage of the inverter circuit (4) due to the on-state voltage drop can be reduced. The output voltage of the inverter circuit (4) can be compensated for the on-state voltage drop of the switching elements ($S_p$, $S_n$), and therefore, a desired voltage can be output.

The second aspect of the present invention is that the switching elements ($S_p$, $S_n$) are unipolar elements in the power converter of the first aspect of the present invention.

In this structure, the switching elements ($S_p$, $S_n$) in which a current can flow in a reverse direction can be easily formed.

The third aspect of the present invention is that each of the switching elements ($S_p$, $S_n$) is made of a wide band gap semiconductor in the power converter of the first or second aspect of the present invention.

In this structure, even if a body diode is provided in a switching element made of a wide band gap semiconductor, the turn-on voltage of the body diode is larger than the turn-on voltage of a body diode provided in a switching element made of Si. Therefore, a range of currents allowed to flow only in the switching elements ($S_p$, $S_n$) is increased, compared to the case in which the power converter includes a switching element made of Si.

The fourth aspect of the present invention is that in the power converter of any one of the first to third aspects of the present invention, the control section (10) makes the correction based on a table in which an output current of the power converter section (4) corresponds to the drop of the on-state voltage according to the output current.

In this structure, the amount of correction in consideration of the on-state voltage drop can be determined according to the magnitude of current flowing in the switching elements ($S_p$, $S_n$).

Advantages of the Invention

According to the first aspect of the present invention, errors due to the on-state voltage drop can be reduced. Thus, the output voltage etc. can be compensated for the on-state voltage drop easily and accurately.

According to the second aspect of the present invention, the above structure can be easily achieved, and the on-state voltage drop can be compensated easily and accurately.

According to the third aspect of the present invention, a range of currents allowed to flow only in the switching elements ($S_p$, $S_n$) is increased. Thus, a range of output current which can be compensated is increased.

According to the fourth aspect of the present invention, the output voltage can be accurately corrected in the case where the on-state voltage drop depends on the magnitude of current flowing in the switching elements ($S_p$, $S_n$).

BRIEF DESCRIPTION OF THE DRAWINGS

FIG. 4 schematically shows differences between a turn-on voltage of a body diode of Si-MOSFET and a turn-on voltage of a body diode of SiC-MOSFET.

DESCRIPTION OF EMBODIMENTS

Embodiments of the present invention will be described in detail below based on the drawings. The foregoing embodiments are merely preferred examples in nature, and are not intended to limit the present invention, applications and use of the invention.

First Embodiment

General Structure of Power Converter

Figure 1:
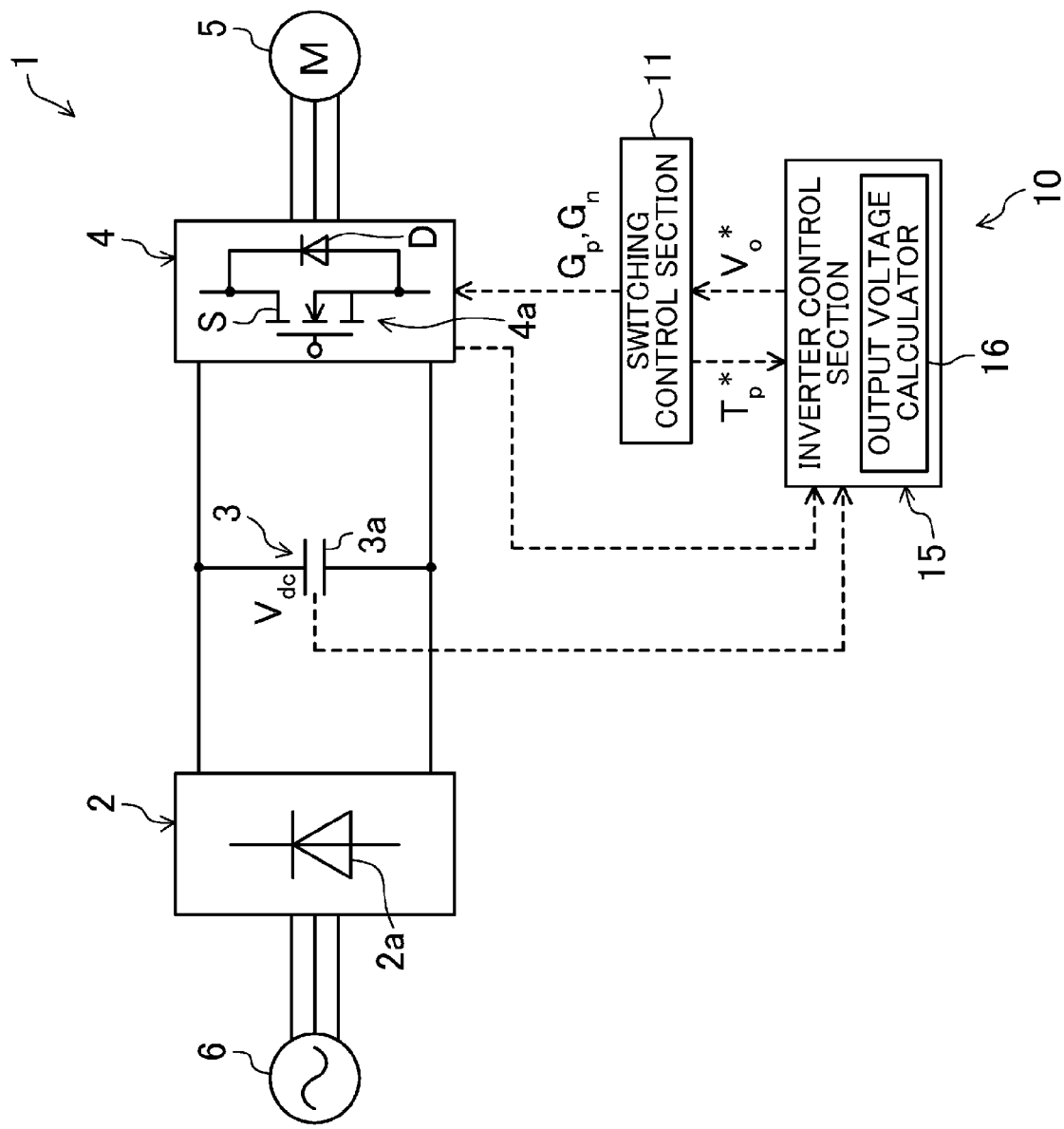
FIG. 1 shows a schematic structure of a power converter according to the first embodiment of the present invention.

FIG. 1 shows a power converter (1) according to the first embodiment of the present invention. The power converter (1) includes a converter circuit (2), a capacitor circuit (3) and an inverter circuit (4). The power converter (1) is used to actuate, for example, an electric motor (5) (hereinafter also referred to as a "motor") of a compressor provided in a refrigerant circuit of an air conditioner. Here, although not specifically shown, the refrigerant circuit of the air conditioner is configured such that the compressor, a condenser, an expansion mechanism, and an evaporator are connected together to form a closed circuit, and a refrigerant circulates to perform a vapor compression refrigeration cycle. With this refrigerant circuit, the air cooled by the evaporator is supplied into a room during a cooling operation, and the air heated by the condenser is supplied into the room during a heating operation.

The converter circuit (2) includes a plurality of diodes (2a), and is configured to rectify alternating-current power output from a commercial power supply (6). Although not specifically shown, the converter circuit (2) forms a rectifier circuit in which a plurality of diodes (2a) (six diodes in the case of three-phase alternating current) are bridge-connected together. In the present embodiment, the converter circuit (2) is comprised of a plurality of diodes (2a), but is not limited to this structure. The converter circuit (2) may be comprised of a switching element, and the switching element may be controlled to rectify the alternating-current power to direct-current power.

The capacitor circuit (3) includes a capacitor (3a) connected in parallel to the output of the converter circuit (2). With this capacitor circuit (3), it is possible to smooth the voltage rectified by the converter circuit (2). As a result, the direct-current power can be supplied to the inverter circuit (4) in a stable manner.

The inverter circuit (4) as well as the capacitor circuit (3) are connected to the converter circuit (2) in parallel. The inverter circuit (4) includes a plurality of switching elements (S) (e.g., six switching elements in the case of three-phase alternating current) in a bridge configuration. That is, although not specifically shown, the inverter circuit (4) includes three switching legs, each having two switching elements (S, S) connected in series to each other, are connected in parallel. The inverter circuit (4) converts the direct-current voltage to alternating-current voltage, and supplies the alternating-current voltage to the motor (5) by on-off operation of the switching elements (S).

The switching elements (S) are unipolar elements such as MOSFETs and JFETs, and made of a wide band gap semiconductor such as SiC and GaN. The switching elements (S) are configured to allow a current to flow in the reverse direction, as well.

In the present embodiment, a diode (D) is connected in antiparallel to each of the switching elements (S). The switching element (S) and the diode (D) form a switching section (4a). Further, in the present embodiment, the diode (D) is a body diode formed in a chip which forms the switching element (S).

Figure 3:
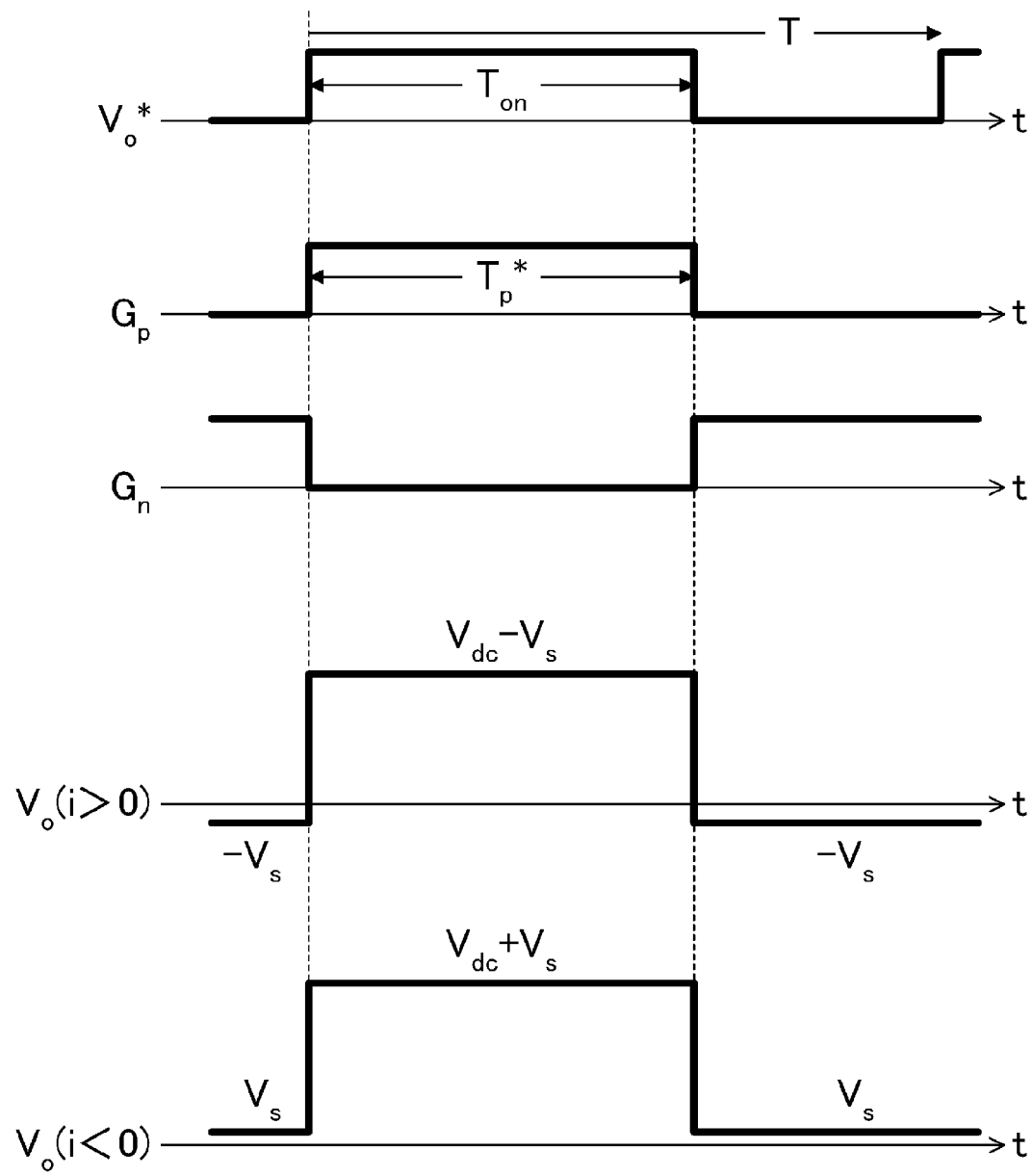
FIG. 3 is a time chart showing a waveform of on signal and a waveform of output voltage in response to a voltage instruction.

Further, the power converter (1) includes a switching control section (11) and an inverter control section (15). The switching control section (11) outputs on signals $G_p$, $G_n$ (gate drive signals) to each of the switching elements (S) of the inverter circuit (4) at predetermined timing. The inverter control section (15) outputs a voltage instruction $V_o^*$ (an instruction signal) to the switching control section (11). That is, each switching element (S) of the inverter circuit (4) is configured to perform on-off operation based on the voltage instruction $V_o^*$ output from the inverter control section (15). The voltage instruction has a signal waveform which is on state during a predetermined output time $T_{on}$ of the unit time T of a carrier cycle, as shown in FIG. 3. Although not specifically shown, the average voltage per unit time T of the carrier cycle is $V^*$ in FIG. 3. Hereinafter, the $V^*$ is simply referred to as the average voltage based on the voltage instruction $V_o^*$.

The switching control section (11) and the inverter control section (15) form a control section (10). The control section (10) is an example control section of the present invention.

The switching control section (11) is configured to decide the timing of outputting the on signals $G_p$, $G_n$ to each of the switching elements (S) based on the voltage instruction $V_o^*$ output from the inverter control section (15). The switching control section (11) outputs the on signals $G_p$, $G_n$ to the two switching elements (S, S) connected in series to each other such that only one of the two switching elements (S, S) is turned on. That is, the switching control section (11) sets, for the two switching elements (S, S), an on-state output duration time $T_p^*$ according to the voltage instruction $V_o^*$. Generally, the switching control section (11) is configured to set dead time in which both of the two switching elements (S, S) are off, but the dead time is ignored in the present embodiment for simplicity of explanation. Indeed, in the dead time when both of the two switching elements (S, S) are off, a current flows in the diode (D) which is connected in antiparallel to each switching element (S), and the on-state voltage is dropped due to the diode (D). However, the dead time is very short, and the on-state voltage drop due to the diode (D) has almost no effect, and therefore, the dead time is ignored here.

The inverter control section (15) is configured to receive, as signals, a demand for load to the electric motor (5) actuated by the inverter circuit (4), information necessary to control the electric motor (5) without detecting the rotational position of a rotor (e.g., an output current i of the inverter circuit (4), a direct-current voltage $V_{dc}$, and on-state output duration time $T_p^*$), etc., and output the voltage instruction $V_o^*$ to the switching control section (11) based on these signals. Further, the inverter control section (15) is configured to correct the voltage instruction $V_o^*$ in consideration of an on-state voltage drop of each switching element (S).

The inverter control section (15) includes an output voltage calculator (16) for calculating an output voltage calculation value V' necessary to detect the rotational position of the rotor of the electric motor (5) without sensors. The output voltage calculator (16) is configured to calculate the output voltage calculation value V' by $T_p^*/T \times V_{dc}$ using the on-state output duration time $T_p^*$ set by the output time $T_{on}$ (hereinafter also referred to as "on-state time") of the on signal determined from the voltage instruction $V_o^*$, and the unit time T of a carrier cycle. The output voltage calculation value V' is the average voltage per carrier cycle T, and is different from an output voltage $V_o$ which is a detected value and an instantaneous value.

Further, the inverter control section (15) is configured to output, when a current flows in the diode (D) connected in antiparallel to one of the two switching elements (S, S) connected together in series, an on signal to the one of the two switching elements (S) to turn on the switching element (S). That is, synchronous rectification is performed in the power converter (1). By this switching control, a reverse direction current can flow in the switching element (S). This can reduce loss compared to the case where the reverse direction current is made to flow in the diode (D).

—Compensation of On-State Voltage Drop—

Next, compensation of an output voltage of the inverter circuit (4) for an on-state voltage drop (or on-state voltage drop compensation) will be described. In the descriptions below, a circuit shown in FIG. 2 which includes a capacitor (3a) as a direct-current power supply, and two switching elements connected together in series, is used for simplicity of explanation. The two switching elements are differentiated from each other by the reference characters $S_p$ and $S_n$ in the following descriptions.

Figure 2:
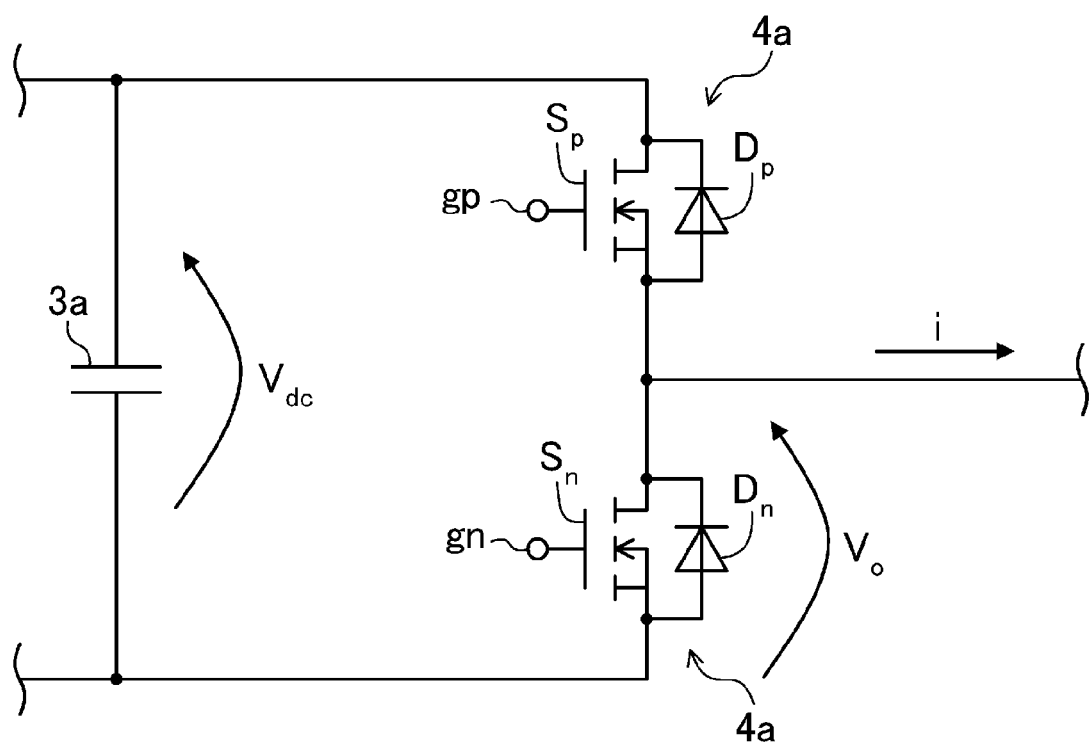
FIG. 2 shows operations of a pair of upper and lower arms in an inverter circuit.

In the circuit shown in FIG. 2, diodes ($D_p$, $D_n$) are connected in antiparallel to the switching elements ($S_p$, $S_n$) connected together in series, respectively. The switching elements ($S_p$, $S_n$) and the diodes ($D_p$, $D_n$) form switching sections (4a, 4a). The midpoint between the switching sections (4a, 4a) is connected to a load (not shown). The reference characters gp, gn in FIG. 2 indicate the gate terminals of the switching elements ($S_p$, $S_n$), respectively.

In the circuit shown in FIG. 2, the switching control section (11) outputs on signals $G_p$, $G_n$ (gate drive signals) according to a voltage instruction $V_o^*$ to the switching elements ($S_p$, $S_n$) when the switching control section (11) receives the voltage instruction $V_o^*$ shown in FIG. 3 from the inverter control section (15). In the case, for example, where the output current i flows to the load in the circuit shown in FIG. 2 (i>0 in this case), a current flows in the switching element ($S_p$) when the on signal $G_p$ is input to the switching element ($S_p$) to turn on the switching element ($S_p$). Thus, the output voltage $V_o$ (which corresponds to a voltage between controlled terminals of the lower-arm switching element ($S_n$)) is represented by $V_{dc}-V_s$ in which an amount $V_s$ of drop of the on-state voltage of the switching element ($S_p$) is subtracted from the voltage $V_{dc}$ of the capacitor (3a). On the other hand, when the switching element ($S_p$) is turned off and the lower-arm switching element ($S_n$) is turned on, a reverse direction current flows in the switching element ($S_n$), and therefore, the output voltage $V_o$ is represented by $-V_s$ which corresponds to the amount of drop of the on-state voltage of the switching element ($S_n$).

Here, a voltage between the controlled terminals of the switching elements ($S_p$, $S_n$) means a voltage between the terminals of the switching elements ($S_p$, $S_n$) of which the current conductivity or non-conductivity is switched by a control terminal (e.g., a gate terminal), such as a voltage between drain and source in the case of a MOSFET.

In contrast, in the case where i<0 (where the output current i flows into the circuit shown in FIG. 2), a reverse direction current flows in the switching element ($S_p$), and the on-state voltage is dropped, when the upper-arm switching element ($S_p$) is turned on. Thus, the output voltage $V_o$ is represented by $V_{dc}+V_s$. Further, a forward direction current flows in the switching element ($S_n$) when the lower-arm switching element ($S_n$) is turned on, and therefore, the output voltage $V_o$ is $V_s$ which is an amount of drop of the on-state voltage of the switching element ($S_n$).

Accordingly, the loss in the inverter circuit (4) can be reduced by allowing a current to flow in the switching element ($S_n$), in which the loss during conduction is smaller than in the diode ($D_n$), at the timing when the current flows in the diode (Dn).

Further, a current is made to flow only in the switching elements ($S_p$, $S_n$) in the inverter circuit (4) irrespective of duty or current polarity as described above, and therefore, the amount $V_s$ of drop of the on-state voltage of the switching elements ($S_p$, $S_n$) is the only amount of drop of the on-state voltage of the device at the output voltage $V_o$ as shown in FIG. 3.

That is, as shown by the formula below, the voltage V (hereinafter simply referred to as an "average output voltage V") per unit time T of a carrier cycle at an actual output voltage deviates from the average voltage specified by the voltage instruction $V_o^*$ by the amount $V_s$ of drop of the on-state voltage of the switching elements ($S_p$, $S_n$). Here, effects of the dead time on the average output voltage V are ignored as described above.

In the case of i>0

[Formula 1]

$$V = \frac{T_p^*}{T}V_{dc} - V_s = V^* - V_s \quad (1)$$

In the case of i<0

[Formula 2]

$$V = \frac{T_p^*}{T}V_{dc} + V_s = V^* + V_s \quad (2)$$

In the present embodiment, the inverter control section (15) considers the amount $V_s$ of drop of the on-state voltage of the switching elements ($S_p$, $S_n$) when deciding the voltage instruction. Specifically, in the case of i>0, the output voltage is smaller by the amount $V_s$ of drop of the on-state voltage of the switching elements ($S_p$, $S_n$) as shown in Formula (1) and FIG. 3. In consideration of this drop, a voltage instruction is output in which $V_s/V_{dc} \times T$ is added to the output time $T_{on}$ of the on signal, the output time $T_{on}$ being determined from the instruction $V_o^*$ for a target voltage, so that the on-state output duration time $T_p^*$ (the output time of the on signal in consideration of the on-state voltage drop) is expressed by

[Formula 3]

$$T_p^* = T_{on} + \frac{V_s}{V_{dc}}T$$

If such a voltage instruction is output,

[Formula 4]

$$V = \frac{T_p^*}{T}V_{dc} - V_s$$
$$= \frac{T_{on} + \frac{V_s}{V_{dc}}T}{T}V_{dc} - V_s$$
$$= \frac{T_{on}}{T}V_{dc} + V_s - V_s$$
$$= V^*$$

holds true.

On the other hand, in the case of i<0, the output voltage is larger by the amount $V_s$ of drop of the switching elements ($S_p$, $S_n$) as shown in Formula (2) and FIG. 3. In consideration of this increase, a voltage instruction is output in which $V_s/V_{dc} \times T$ is subtracted from the output time $T_{on}$ of the on signal, the output time $T_{on}$ being determined from the instruction $V_o^*$ for a target voltage, so that the on-state output duration time $T_p^*$ is expressed by

[Formula 5]

$$T_p^* = T_{on} - \frac{V_s}{V_{dc}}T$$

If such a voltage instruction is output,

[Formula 6]

$$V = \frac{T_p^*}{T}V_{dc} + V_s$$
$$= \frac{T_{on} - \frac{V_s}{V_{dc}}T}{T}V_{dc} + V_s$$
$$= \frac{T_{on}}{T}V_{dc} - V_s + V_s$$
$$= V^*$$

holds true.

This compensation allows the average output voltage V to accord with the average voltage specified by the voltage instruction $V_o^*$. That is, the control section (10) according to the present embodiment corrects the on-state time of each of the switching elements ($S_p$, $S_n$) which is determined from the output voltage of the inverter circuit (4), based on the amount ($V_s$) of drop of the on-state voltage of the switching elements ($S_p$, $S_n$).

It is preferable that a current flows only to the switching elements ($S_p$, $S_n$) so that the on-state voltage drop can be compensated easily and accurately. In this case, the voltage applied to the switching section (4a) needs to be lower than the turn-on voltage by which the voltage diodes ($D_p$, $D_n$) are turned on. Specifically, as shown in FIG. 4, switching elements such as MOSFETs have almost no turn-on voltage, whereas body diodes of MOSFETs made of Si (Si-MOSFETs) and freewheeling diodes (SBDs) made of SiC have, in general, a turn-on voltage of 1 V or so. Thus, in an inverter circuit including body diodes of Si-MOSFETs or SBDs made of SiC, the above on-state voltage drop compensation can only be performed when the voltage is in a range in which no current flows to the diodes ($D_p$, $D_n$), that is, the on-state voltage drop is 1 V or less (1/Ron (on resistance) or less in terms of current flow).

In contrast, in the present embodiment, the switching elements ($S_p$, $S_n$) are wide band gap semiconductors made of such as SiC, and instead of using a freewheeling diode, a body diode formed in a chip of each of the switching elements ($S_p$, $S_n$) is used. Thus, in the present embodiment, it is possible to increase the turn-on voltage of the diode as shown in FIG. 4, thereby making it possible to increase the range in which the on-state voltage drop can be compensated. For example, the turn-on voltage of the body diode formed in the chip of each switching element ($S_p$, $S_n$) made of a wide band gap semiconductor such as SiC is, in general, about 3 V, which is about three times the turn-on voltage of a body diode of an Si-MOSFET or an SBD made of SiC, and thereby making it possible to increase the range in which the on-state voltage drop can be compensated.

Effects of First Embodiment

As described above, according to this embodiment, the switching elements ($S_p$, $S_n$) are controlled such that a reverse direction current flows into the switching elements ($S_p$, $S_n$) in the inverter circuit (4), and therefore, the on-state voltage drop of the switching elements ($S_p$, $S_n$) can be the only drop of the on-state voltage of the device in the inverter circuit (4) irrespective of duty or current polarity. Accordingly, it is possible to easily and accurately obtain the on-state voltage drop in the inverter circuit (4) irrespective of duty or current polarity, and based on the on-state voltage drop, the on-state voltage drop can be compensated with accuracy.

Further, in the switching control section (11), the on-state voltage drop is considered when the voltage instruction is decided. This allows the average output voltage V to accord with the average voltage specified by the voltage instruction $V_o^*$. Accordingly, an output voltage error due to an on-state voltage drop of the switching elements ($S_p$, $S_n$) can be reduced.

Moreover, since wide band gap semiconductors made of such as SiC are used as the switching elements ($S_p$, $S_n$), and body diodes are used as the diodes ($D_p$, $D_n$), the on-state voltage drop compensation as described in the present embodiment can be applicable in a wider range, compared to a circuit configuration including a body diode of a switching element made of Si, or a freewheeling diode made of a wide band gap semiconductor.

<<Related Techniques>>

A related technique of the present invention will be described below. The related technique is different from the first embodiment in the configuration of the output voltage calculator (16) of the inverter, and the method by which the on-state voltage drop is compensated. In the following descriptions, like reference characters have been used to designate the same elements as in the first embodiment, and only different elements are described.

Specifically, an output voltage calculator (16) according to the present related technique is configured to consider an amount $V_s$ of drop of an on-state voltage of a switching element ($S_p$, $S_n$), when calculating an output voltage calculation value by $T_p^*/T \times V_{dc}$ using on-state output duration time $T_p^*$ set by output time $T_{on}$ of an on signal, and unit time T of a carrier cycle. That is, the output voltage calculator (16) obtains an output voltage calculation value V' which is equal to an actual average output voltage V by, in the case of i>0, subtracting the amount $V_s$ of drop of the on-state voltage from the output voltage calculation value $T_p^*/T \times V_{dc}$, and in the case of i<0, adding the amount $V_s$ of drop of the on-state voltage to the output voltage calculation value $T_p^*/T \times V_{dc}$, as shown below.

In the case of i>0

[Formula 7]

$$V' = \frac{T_p^*}{T}V_{dc} - V_s = V$$

In the case of i<0

[Formula 8]

$$V' = \frac{T_p^*}{T}V_{dc} + V_s = V$$

The output voltage calculation value V' obtained in this manner is used for sensorless control of the rotation of a motor. It is possible to accurately control the motor by using such a calculation method capable of accurately calculating a value equal to an actual output voltage V as described above.

—Effects of Related Technique—

According to the related technique, the output voltage is calculated in consideration of an amount $V_s$ of drop of the on-state voltage of the switching elements ($S_p$, $S_n$), and therefore, it is possible to obtain the output voltage calculation value V' equal to the actual average output voltage V. Therefore, accuracy in calculating the output voltage can be improved.

Even if the actual average output voltage V deviates from the average voltage V* specified by the voltage instruction $V_o$* due to the effects of the on-state voltage drop of the switching elements ($S_p$, $S_n$), the output voltage calculation value V' can be accurately obtained. Therefore, the motor can be accurately controlled using the output voltage calculation value V'.

Other Embodiments

The following structures may also be used in the above embodiment.

In the above embodiment, body diodes formed in the chips of the switching elements ($S_p$, $S_n$) are used as the diodes ($D_p$, $D_n$). However, the structure is not limited to this structure, and the switching elements ($S_p$, $S_n$) may be comprised of JFETs in which a current can flow in a reverse direction, and the diodes connected in antiparallel to the switching elements ($S_p$, $S_n$) may be omitted. In the case where no diode is provided, switching control methods include turning on a switching element (S) at a predetermined timing when a reverse direction current flows to the switching element (S).

Further, in the above first embodiment, the inverter control section (15) is configured to output a voltage instruction in consideration of an on-state voltage drop of the switching elements ($S_p$, $S_n$). However, the structure is not limited to this structure, and the on-state voltage drop may be considered when the switching control section (11) determines the output time of the on signal.

Further, the present invention is applicable to various electrical power conversion devices other than the inverter circuit described above. For example, the present invention can also be applicable to a converter circuit.

Further, the present invention is not limited to the sensorless control power converters. The present invention can also be applicable to the cases where a sensor detects a rotational position of a motor.

Further, the on-state voltage drop depends on the magnitude of current flowing in the switching elements ($S_p$, $S_n$). Therefore, the output voltage may be corrected in consideration of the dependency. For example, a table in which the output current of the inverter circuit (4) corresponds to a drop of on-state voltage according to the output current may be provided in a control section (10), and the control section (10) may correct the output voltage based on the table.

INDUSTRIAL APPLICABILITY

The present invention is useful as a power converter which includes a power converter section having a plurality of switching elements.

DESCRIPTION OF REFERENCE CHARACTERS 1 power converter
3 capacitor circuit
3a capacitor
4 inverter circuit
4a switching section
5 electric motor
10 control section
11 switching control section
15 inverter control section
16 output voltage calculator
S, $S_p$, $S_n$ switching element
D, $D_p$, $D_n$ diode
$G_p$, $G_n$ gate terminal

The invention claimed is:

1. A power converter comprising:
a power converter section (4) having a plurality of switching elements ($S_p$, $S_n$) in which a current can flow in a reverse direction, and
a control section (10) which determines on-state time of each of the switching elements ($S_p$, $S_n$) according to an output voltage of the power converter section (4), thereby switching on/off states of the switching elements ($S_p$, $S_n$), wherein
the control section (10) instructs the power converter section (4) to perform synchronous rectification so that a predetermined one or more of the switching elements ($S_p$, $S_n$) is turned on, to make a current flowing through the predetermined one or more of the switching elements ($S_p$, $S_n$) flow in the reverse direction, and corrects the on-state time according to a drop of an on-state voltage of only the switching elements ($S_p$, $S_n$).

2. The power converter of claim 1, wherein
the switching elements ($S_p$, $S_n$) are unipolar elements.

3. The power converter of claim 1, wherein
each of the switching elements ($S_p$, $S_n$) is made of a wide band gap semiconductor.

4. The power converter of claim 1, wherein
the control section (10) makes the correction based on a table in which an output current of the power converter section (4) corresponds to the drop of the on-state voltage according to the output current.

* * * * *